US005828158A

United States Patent [19]

Chatellard

[11] Patent Number: 5,828,158

[45] Date of Patent: Oct. 27, 1998

[54] TRAVELING WAVE PIEZOELECTRIC MOTOR

[75] Inventor: David Chatellard, Saint Gervais Les Bains, France

[73] Assignee: Figest BV, Netherlands

[21] Appl. No.: 791,255

[22] Filed: Jan. 30, 1997

[30] Foreign Application Priority Data

Feb. 29, 1996 [FR] France .................................. 96 02549

[51] Int. Cl.[6] ............................ H01L 41/09; H02N 2/00

[52] U.S. Cl. .......................... 310/328; 310/323; 310/369

[58] Field of Search .................................... 310/323, 328, 310/367, 369

[56] References Cited

U.S. PATENT DOCUMENTS

| | | | |
|---|---|---|---|
| 4,272,200 | 6/1981 | Hehl | 310/323 |
| 4,431,934 | 2/1984 | Kleinschmidt et al. | 310/331 |
| 4,785,177 | 11/1988 | Besocke | 310/328 |
| 4,944,580 | 7/1990 | MacDonald et al. | 310/328 |
| 5,594,330 | 1/1997 | Jacobsen | 310/328 |
| 5,626,312 | 5/1997 | Head | 310/328 |
| 5,693,997 | 12/1997 | Griffith et al. | 310/328 |

FOREIGN PATENT DOCUMENTS

| | | | |
|---|---|---|---|
| 2690018 | 10/1993 | France | H02N 2/00 |
| 1-43074 | 2/1989 | Japan | 310/323 |
| 62-155782 | 7/1989 | Japan | 310/323 |
| 2-260476 | 10/1990 | Japan | 310/328 |
| 4-54877 | 2/1992 | Japan | 310/369 |
| 2 270 198 | 3/1994 | United Kingdom | 310/369 |
| WO9505682A | 2/1995 | WIPO | H01L 41/09 |

OTHER PUBLICATIONS

Patent Abstracts of Japan 01243860A (Matsushita Eelctric Inc. Co. Ltd.), 28 Sep. 1989, *abrege*.

French Search Report Nov. 15, 1996 France.

*Primary Examiner*—Thomas M. Dougherty

*Attorney, Agent, or Firm*—Laff, Whitesel, Conte & Sarat, Ltd.

[57] ABSTRACT

Traveling-wave piezoelectric motor comprising at least one stator (1, 2) consisting of an annular body with which are associated two groups of piezoelectric elements (3, 4) in the form of rods in permanent contact with the stator and with a connector (7) for their excitation, and a rotor (12, 13). The rods (3, 4) are housed in a drum (5, 6) made of an insulating material whose holes have a constriction (24) for holding the rods.

11 Claims, 4 Drawing Sheets

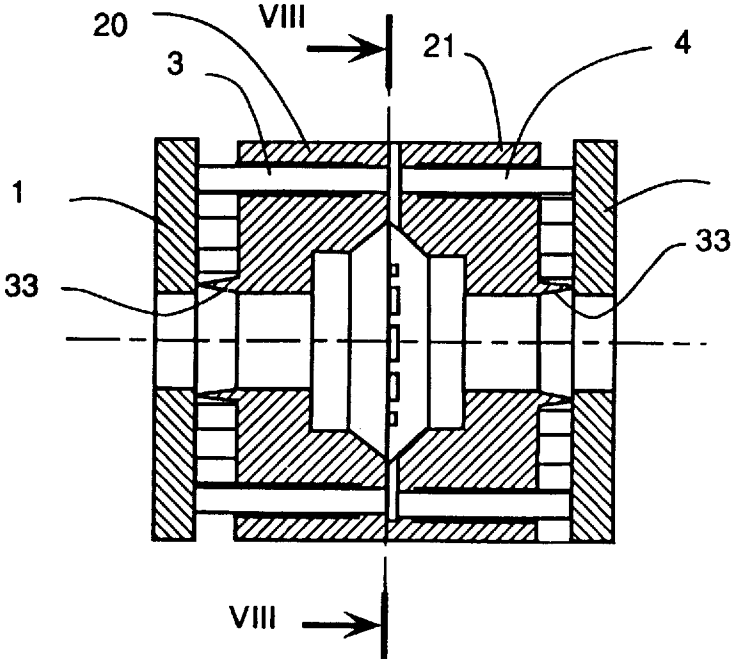
FIG 7
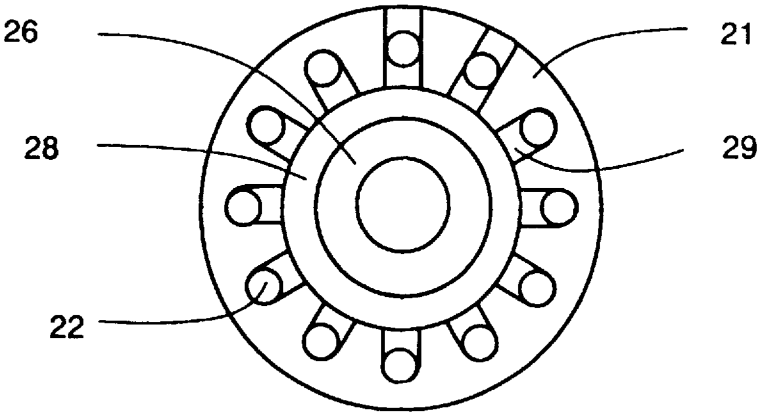
FIG 8
FIG 9
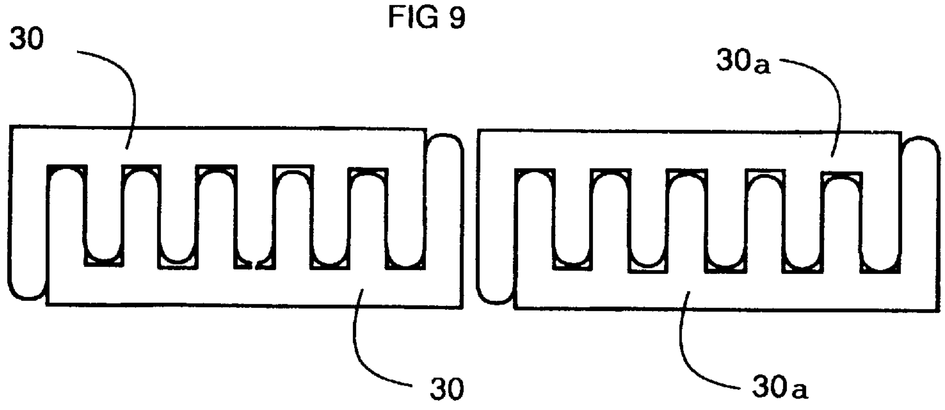

TRAVELING WAVE PIEZOELECTRIC MOTOR

FIELD OF THE INVENTION

The subject of the present invention is a traveling-wave piezoelectric motor comprising at least one stator consisting of an annular body with which are associated two groups of piezoelectric elements consisting of cylindrical polarized ceramic rods which are independent of one another, are arranged perpendicularly to the stator, that is to say parallel to the axis of the motor, and are distributed around the stator, in permanent contact, via one of their ends, with the stator and, via the other end, with a connector by way of which the rods are excited by an alternating current with a phase-shift of $\pi/2$ between the groups of rods so as to generate on the surface of the stator a deformation in the form of a traveling wave, and a rotor held elastically in contact with the stator for the rotational driving thereof by the traveling wave generated on the stator.

PRIOR ART

Such a motor is known from patent FR 2 709 214. The practical embodiment of the motor described in this patent consists of two stators between which are mounted double-polarization ceramic rods held in position by a disk of a synthetic substance, and of two rotors respectively driven by each of the stators, the whole being mounted in a casing consisting of two shells the uniting of which ensures a pressure on the rotors by way of an elastic washer. The ceramic rods form a squirrel cage axially traversed by a shaft to which the rotors are fixed.

In a further development of this motor, the ceramic rods are separate for each of the stators and the voltage supply to the rods is ensured by a connector clamped, in the middle of the motor, between the rods of each of the stators, these rods furthermore being subjected to a prestress having the effect of pressing them against the connector. The connector consists of two cut-out metal pieces forming two supply tracks, one for each group of rods. These metal pieces can be in the same plane, one being situated around the other, or in two different planes separated by a washer made of a dielectric material withstanding the peak supply voltage. The rods are fixed to the stator by means of glue, the stator furthermore possibly having notches for positioning these rods.

When manufacturing such a motor, the ceramic rods need to be held in place so long as the stators are not united by the prestressing means, so that such a construction does not lend itself to the manufacture of small motors since no economical structure exists which is suitable for holding the rods in place for mounting. Only techniques for gluing and for positioning can at great expense solve this problem which arises likewise for a motor with single stator and single rotor.

The objective of the invention is to produce a piezoelectric motor of the type described above, but with a structure such that its manufacture, more particularly the assembling of its components, is easy and lends itself to the manufacture of small-sized motors.

For this purpose, the rods are housed in a drum made of an insulating material whose holes, each containing a rod, have a diameter greater than the diameter of the rods over the greater part of their length and a constriction of diameter approximately equal to the diameter of the rods so as to hold the rods by friction.

When manufacturing the motor, the ceramic rods are firstly introduced into the drum in which they are positioned angularly and held by the constrictions of the holes in the drum. The drum equipped with these rods thus constitutes an easily handled module which may be readily threaded onto the shaft of the rotor for the binding thereof between the stator and the connector.

The position of the constrictions of the holes in the drum is, preferably, such that the rods are clamped in the immediate proximity of their vibration node so as not to perturb the steady vibratory state of the rods.

The motor will consist, preferably, of two stators and of two rotors, like the prior art motor, that is to say also two drums which are, preferably, clamped between the stator and a central connector. The mutual angular positioning of the drums can be ensured by any known means, in particular by mating-profile interlocking. A tenon formed on one of the drums engaging in a mortice in the other drum will suffice.

The connector can be made in various ways, but, in all events, it will be made, preferably, in such a way that it can be fixed by encasing by one of the drums.

BRIEF DESCRIPTION OF THE DRAWINGS

The appended drawing represents, by way of example, three embodiments of the motor according to the invention.

FIG. 7 represents the drums of FIG. 4 containing the ceramic rods and assembled between the stators, but without the connector.

FIG. 8 is a sectional view on VIII—VIII of FIG. 7.

FIG. 9 illustrates a particularly economical way of cutting out the connector represented in FIGS. 4, 5 and 6.

DESCRIPTION OF THE PREFERRED EMBODIMENTS

Figure 1:
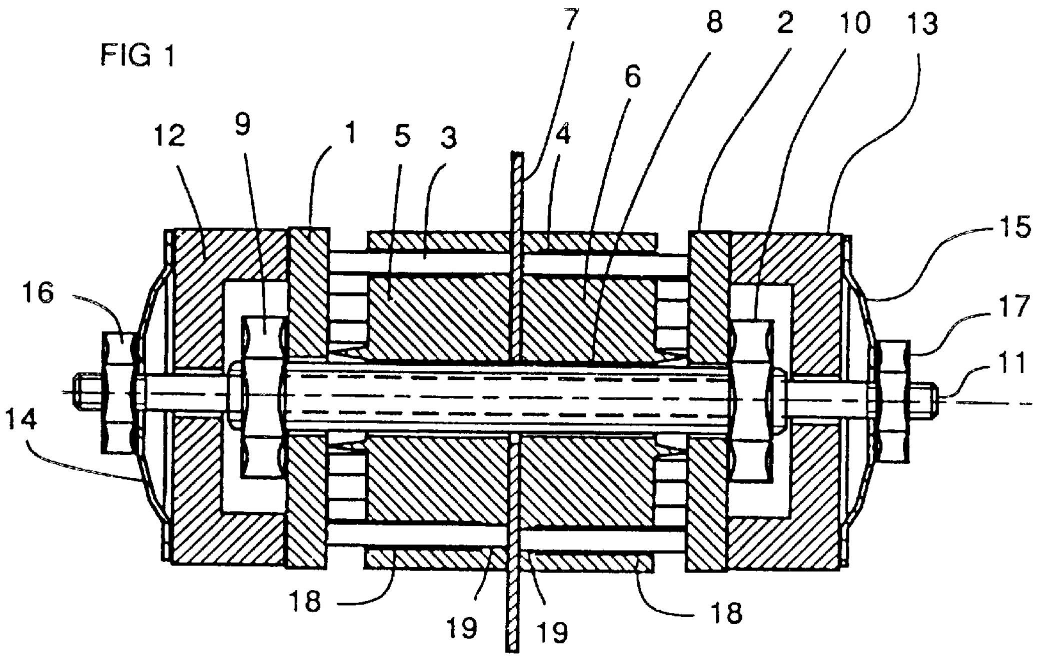
FIG. 1 is an axial sectional view of a motor according to a first embodiment.

The motor represented in FIG. 1 comprises two disk-shaped stators 1 and 2. These disks, are, preferably, cut out so as to form an annulus linked to a hub by spokes. Two sets 3 and 4 of twelve cylindrical ceramic piezoelectric rods are mounted between the stators. Each of these sets 3 and 4 is mounted in a drum 5, respectively 6 made of a dielectric material. The rods of each set are distributed in two groups of six rods distributed circularly about the axis of the motor with a 60° space between the rods of one and the same group, the rods of the two groups furthermore being intercalated in such a way that there is one rod every 30°. The sets of rods 3 and 4 and the drums 5 and 6 are clamped between the two stators 1 and 2, a connector 7 being itself clamped between the two groups of rods 3 and 4 for their voltage supply. Assembly of the stators 1 and 2 and of the drums 5 and 6 with their rod is ensured by a threaded tube 8 on which are screwed nuts 9 and 10 bearing on the stators, in particular on the hub of these stators. The tube 8 is freely traversed by a shaft 11 to which are keyed two rotors 12 and 13 in the form of cylindrical cans which are kept applied elastically against the stators 1 and 2 by springs 14 and 15 pressed by nuts 16 and 17 screwed onto the threaded ends of the shaft 11. The springs 14 and 15 are, for example, Belleville washers.

The drums 5 and 6 are drilled with as many holes as there are rods. Over the greater part of their length, these holes have a diameter 18 greater than the diameter of the rods, so that these rods do not come into contact with the wall of the holes during their vibration. Over a short length the holes in the drums have a constriction 19 of a diameter such that the rods are held by this constriction. These constrictions are, preferably, in the immediate proximity of a vibration node of the rods so as not to perturb their steady vibratory state.

Figure 2:
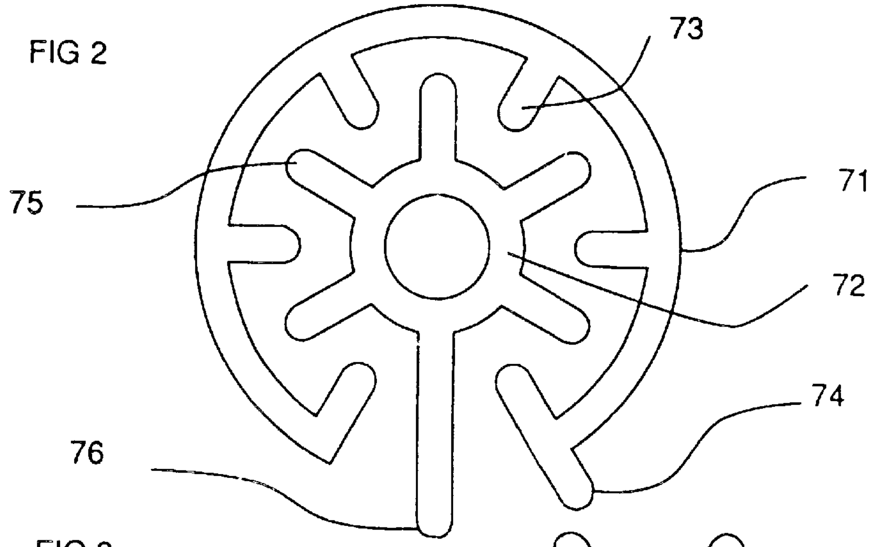
FIG. 2 is a front plane view of the connector of the motor represented in FIG. 1.

The connector 7 is represented in FIG. 2. It consists of two metal pieces 71 and 72 forming two conducting tracks obtained by cutting out. The conducting track 71 surrounds the conducting piece 72 and has six tongues 73 directed radially toward the center of the connector, one of these tongues having an outer extension 74 so as to constitute a first connection pin for a supply conductor for the motor. The track 72 has six tongues 75 directed radially outward and intercalating between the tongues of the track 71. One of the tongues 75 is extended so as to constitute the second connection pin of the motor. One of the groups of each of the sets of rods 3 and 4 is brought to bear on the tongues 73 of the track 71, whilst the other rods are brought to bear on the tongues 75 of the track 72 centered by its central hole on the tube 8.

Figure 3:
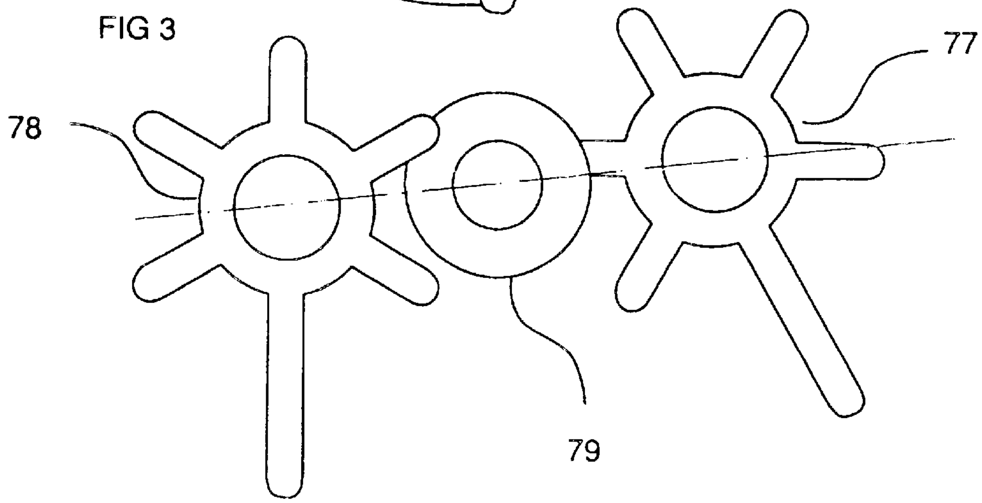
FIG. 3 is an exploded view of another embodiment of a connector which can be used in the motor represented in FIG. 1.
Figure 4:
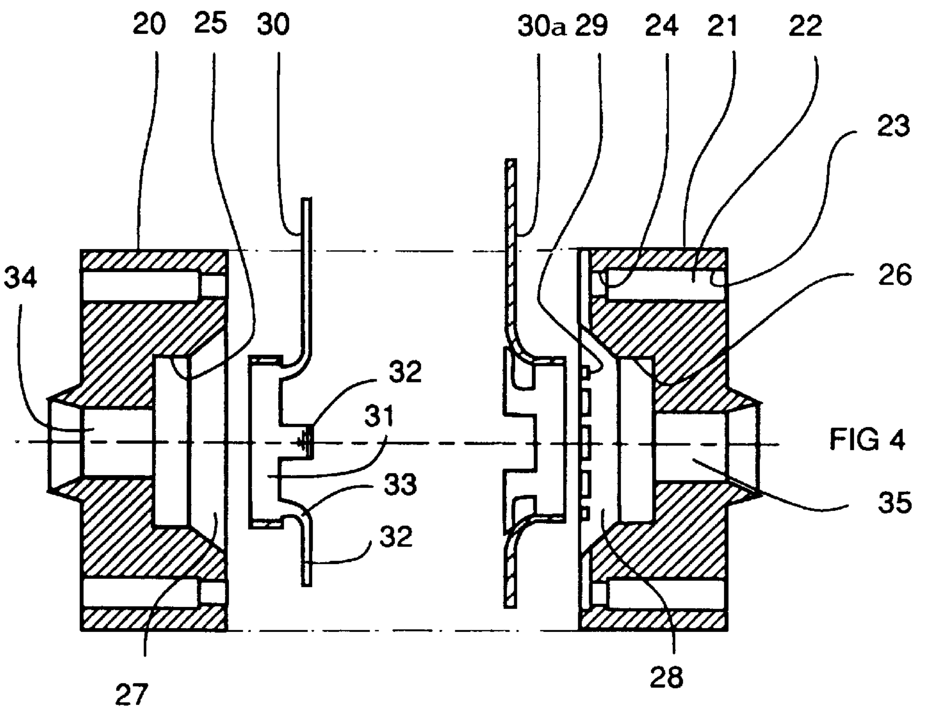
FIG. 4 is an exploded view of the drums and of the connector according to a second embodiment.
Figure 5:
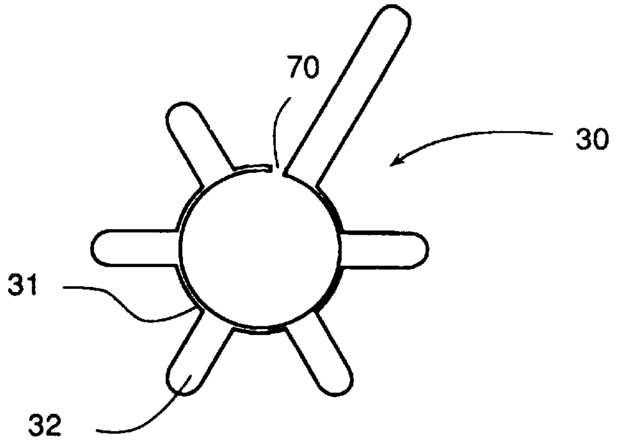
FIG. 5 is a front plane view of one of the connector tracks of FIG. 4.
Figure 6:
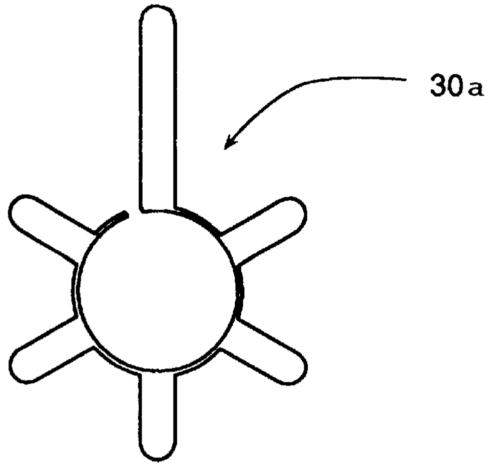
FIG. 6 is a front plane view of the other connector of FIG. 4.

A variant embodiment of the connector of FIG. 2 is represented in FIG. 3. It consists of two identical cut-out tracks 77 and 78 each representing six radial tongues, these two tracks being overlaid, with intercalation of a washer 79 made of an insulating material, and angularly staggered by 30°.

The opposed faces of the drums 5 and 6 are furnished with mutual means of angular positioning. These positioning means advantageously consist of mating profiles allowing the drums to be interlocked one inside the other. This interlocking is, preferably, firm interlocking, so that the drums, once assembled, constitute an easily handled monolithic module. The connector must nevertheless still be positioned in an angularly correct manner between the drums which will then receive the piezoelectric rods for subsequent assembly of the motor.

The drums may also be assembled together by means of clamps forming part of the drums or by means of clips so as to constitute a handleable subassembly which can be transported and used as is when constructing a motor.

FIGS. 4 to 9 illustrate a second embodiment in which the connectors can be preassembled to each of the drums, one at least of which has angular positioning means for the two conducting tracks of the connector. The drums 20 and 21 have, like the drums 5 and 6 of the first embodiment, holes 22 intended to receive the piezoelectric rods, these holes 22 having a first diameter 23, over the greater part of their length, greater than the diameter of the rods, and a constriction 24 ensuring the holding of the rods in the drum by clamping. On their opposed faces, the drums 20 and 21 have a cylindrical central hollow 25, respectively 26, linked to the front face of the drum by a frustoconical part 27, respectively 28. The front face of the drum 21 furthermore has radial grooves 29, twelve in number, regularly distributed about the axis of the drum, the role of which grooves will be described below.

The drums 20 and 21 furthermore have a central hole 34, respectively 35 of diameter corresponding to the outer diameter of the tube 8 for centering these drums on the tube 8.

The connector again consists of two identical conducting tracks 30, 30*a*. Therefore, the track 30 alone, represented in FIG. 5, will be described. The track 30 is made of a conducting material exhibiting a degree of resilience. It comprises a cylindrical part 31 furnished with a resilient slot 70 and from which there run six radial tongues 32 one of which is longer than the others so as to constitute the exterior connection pin of the motor. These tongues 32 are linked to the cylindrical part 31 by a rounded elbowed part 33, so that they are offset with respect to the cylindrical part 31 in a direction parallel to the axis of the cylindrical part 31.

In the free condition, the outer diameter of the cylindrical part 31 of each of the tracks 30 is greater than the diameter of the cylindrical housings 25 and 26 of the drums. The depth of these housings 25 and 26 is approximately equal to the height of the cylindrical part 31.

When assembling the drums 20 and 21 of the connector, each of the tracks 30, 30*a* of the connector is inserted into the housing provided in the drum. This insertion is effected simply by pressing on the track, the conical parts 27 and 28 automatically binding the cylindrical parts 31 of the tracks, these parts 31 becoming fixed into the drums. The track introduced into the drum 21 is positioned angularly in this drum by engaging its tongues in the grooves 29 whose depth is equal to the thickness of these tongues. The two drums 20 and 21, furnished with their track 30 30*a,* are then assembled. The track 30 of the drum 20 is rotated until these tongues engage in the free grooves 29. The two tracks 30, 30*a* are thus correctly mutually positioned angularly. As in the first embodiment, the two drums 20 and 21 have mutual angular interlocking and positioning means such that their holes are situated facing one another.

According to a variant embodiment, the two drums 20 and 21 have grooves 29, but the latter have a depth equal to half the thickness of the tracks 30, 30*a*. This affords two perfectly identical drums, that is to say a single mold for manufacturing the drums.

According to another variant embodiment, the parts 31 are not slotted and their diameter is equal to the diameter of the housings 25 and 26.

FIG. 7 represents the drums 20 and 21 equipped with their rods 3 and 4 and assembled between the two stators 1 and 2, but without the connector. So as not to disturb the circulation of the traveling wave in the stators 1 and 2, a significant clearance is left between the drums 3 and 4 and the stators 1 and 2. Since., however, the drums must be kept pressed together, they have, on the stator side, protuberances 33 which are brought to bear via a slender ridge against the central part of the stators. If the stators are made as described in patent application FR No. 96 00061, these protuberances bear on the hub of the stator, that is to say in the region of prestress exerted by the nuts 9 and 10 (FIG. 1). The absence of the dielectric of the drum around the rods, between the drums and the stators, is of no importance since the difference in potential between the rods is low at this location by reason of the proximity of the mass formed by the stator.

The region of contact between the rods and the tongues 32 of the connector is, preferably, reduced to the minimum necessary to avoid sparking or arcing between adjoining contact regions, despite the presence of the dielectric of the drum.

FIG. 9 illustrates the cutting-out of the two parts of the connector 30, 30*a*. It emerges from this figure that the connector is particularly economical as regards raw material. The loss on cutting-out is minimal. The connector is then formed by bending and rolling.

Figure 10:
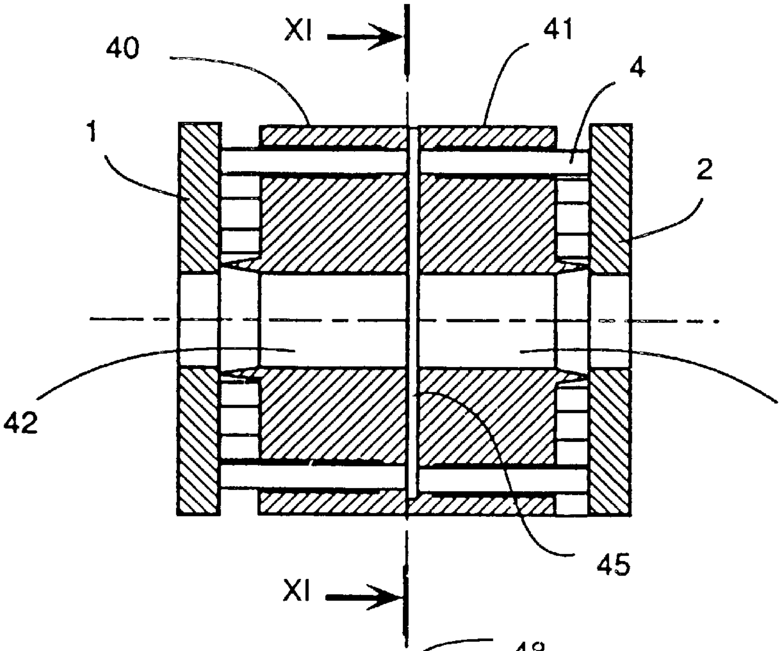
FIG. 10 represents the stator part of a motor according to a third embodiment.
Figure 11:
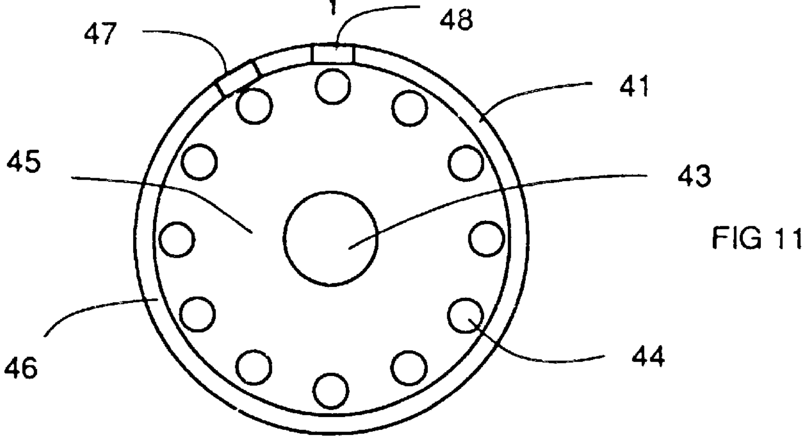
FIG. 11 is a sectional view on XI—XI of FIG. 10.
Figure 12:
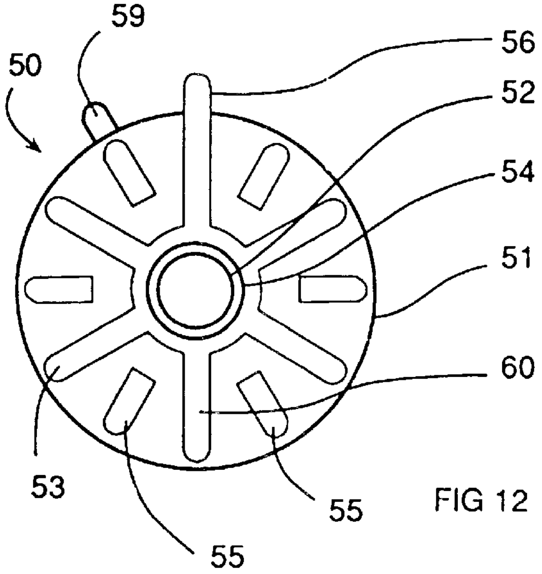
FIG. 12 represents one of the faces of the disk-shaped connector provided for this third embodiment.
Figure 13:
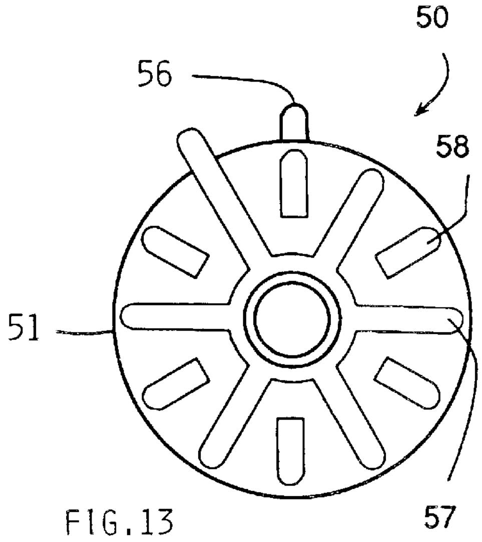
FIG. 13 represents the other face of the same disk-shaped connector.

Another embodiment of the drums and of the connector is represented in FIGS. 10 to 12. FIGS. 10 and 11 again represent the drums without the connector which is represented in FIG. 12.

The drums 40 and 41 differ from the drums 20 and 21 of the second embodiment merely through the configuration of their opposed faces.

These drums have an axial hole 42, respectively 43 for their centering on the tube 8, FIG. 1. The drum 40 has a plane and uniform face opposite the drum 41.

In addition to the twelve holes 44, for passage of the ceramic rods, the drum 41 has a circular hollow 45, of small depth, in its face opposite the drum 40. This hollow 45 leaves behind an annular collar 46 punctured by two gaps 47 and 48 situated opposite two holes 44.

The connector 50 consists of a disk 51 of insulating material whose two faces are represented in FIG. 12. The disk 51 has a central circular hole 52 for centering thereof on the tube 8. Formed on one of the faces of the disk 51 are two groups of conducting tracks, a first group consisting of six radial tongues 53 linked by an annular central part 54 and a second group consisting of six independent conducting track segments 55 arranged between the tongues 53.

One of the tongues 53 is extended outside the periphery of the disk 51 so as to constitute an exterior connection terminal 56. The other face of the disk 51 has, in an identical manner, a first group of conducting tracks which consists of six tongues 57 linked by an annular central part and a second group which consists of six independent conducting track segments 58 situated between the tongues 57 of the first group. One of the tongues 57 is extended outside the periphery of the disk 51 so as to constitute the other exterior connection terminal. The independent track segments 55 and 58 are therefore situated facing a conductive tongue of the opposite face of the disk and they are linked galvanically to this tongue by a metallized hole through the disk, which hole is situated at 60.

The disk 51 will be housed in the housing 45 of the drum 41, the depth of the housing being equal to the thickness of the disk together with its conducting tracks. The disk 51 is also centered by the housing 45.

In a manner such as to obtain, in respect of molding, two identical drums, it would, of course, be possible to replace the hollow 45 by two hollows of semi-depth in each of the drums.

The extended tongues 56 and 59 will be housed in the gaps 47 and 48 which thus angularly position the connector.

The motor according to the invention is, of course, realizable with a single stator and a single rotor, that is to say a single drum and a single group of rods. In this case, the end of the shaft 11 away from the rotor is simply supported by a ball bearing.

I claim:

1. A traveling-wave piezoelectric motor comprising at least one stator (1, 2) consisting of an annular body with which are associated two groups of piezoelectric elements (3, 4) consisting of cylindrical polarized ceramic rods which are independent of one another, are arranged perpendicularly to the stator, that is to say parallel to the axis of the motor, and are distributed around the stator, in permanent contact, via one of their ends, with the stator and, via the other end, with a connector (7; 30; 50) by way of which the rods are excited by an alternating current with a phase-shift of $\pi/2$ between the groups of rods so as to generate on the surface of the stator a deformation in the form of a traveling wave, and a rotor (12, 13) held elastically in contact with the stator for the rotational driving thereof by the traveling wave generated on the stator, wherein the rods (3, 4) are housed in a drum (5, 6; 20, 21; 40, 41) made of an insulating material whose holes, each containing a rod, have a diameter greater than the diameter of the rods over the greater part of their length and a constriction (24) of diameter approximately equal to the diameter of the rods so as to hold the rods by friction.

2. The motor as claimed in claim 1, wherein the position of said constrictions (24) is such that the rods are retained in the immediate proximity of a vibration node.

3. Motor as claimed in claim 1, wherein it consists of a pair of drums (5, 6) arranged coaxially between two coaxial stators (1, 2) each associated with a rotor (12, 13) on either side of a central connector (7), and means of axial assembly (8, 9, 10) exerting a pressure on the stators such that the drums are pressed together so that the rods are compressed axially between the stators and the connector.

4. The motor as claimed in claim 3, wherein the drums are furnished with mutual means of angular positioning, in particular consisting of mating profiles.

5. The motor as claimed in claim 4, wherein the drums exhibit, on the stator side, prominences (33) onto which the stators are pressed.

6. The motor as claimed in claim 3, wherein the opposed faces of the drums (20, 21) have a cylindrical central housing (25, 26) and wherein the connector (30) consists of two metal pieces each having a cylindrical central part (31) from which radial tongues (32) depart, the cylindrical part (31) being housed in said housing of the drum, the radial tongues of the two pieces being angularly staggered with respect to each other.

7. The motor as claimed in claim 6, wherein the depth of said cylindrical housings (25, 26) of the drums is greater than the height of the slotted cylindrical part (31) of the connector, wherein the radial tongues (32) are offset axially relative to the slotted cylindrical part and wherein said slotted cylindrical parts are set back from the face of the corresponding drums, in such a way that the two pieces of the connector may not come into contact with one another.

8. The motor as claimed in claim 7, wherein one of the drums (21) has, in its face receiving the connector (30), radial grooves (29) in which the tongues (32) of the connectors are housed and angularly positioned, the depth of these grooves being at least approximately equal to the thickness of the tongues.

9. The motor as claimed in claim 7, wherein the faces of the drums (20, 21) receiving the connector (30) each have radial grooves situated facing one another, in which the tongues of the connector are housed and positioned, the depth of these grooves being at least approximately equal to a semi-thickness of the tongues (32).

10. The motor as claimed in claim 3, wherein the connector (50) consists of a disk (51) made of an insulating substance, the two faces of which are furnished with two groups of conducting tracks, a first group (53, 57) consisting of radial tongues linked to an annular central part and a second group (55, 58) consisting of independent segments situated between the tongues, the segments of one face being galvanically linked to the corresponding tongues of the other faces across the disk.

11. The motor as claimed in claim 10, wherein at least one of the drums (41) has a housing (45) in which the connector (50) is housed and centered.

* * * * *